(12) United States Patent
Gajdos et al.

(10) Patent No.: US 7,994,930 B2
(45) Date of Patent: Aug. 9, 2011

(54) PRODUCT PLACEMENT

(75) Inventors: Tom Rudolf George Gajdos, Dalby (SE); Jenny Irene Pettersson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 561 days.

(21) Appl. No.: 11/554,151

(22) Filed: Oct. 30, 2006

(65) Prior Publication Data

US 2008/0104634 A1 May 1, 2008

(51) Int. Cl.
*G08B 3/00* (2006.01)
(52) U.S. Cl. ........................................ 340/691.1; 725/32
(58) Field of Classification Search .................. 340/500, 340/691.1; 725/32, 34, 35, 115, 116, 117, 725/118
See application file for complete search history.

(56) References Cited

U.S. PATENT DOCUMENTS

| 6,009,410 | A | 12/1999 | LeMole et al. |
| 6,684,194 | B1 * | 1/2004 | Eldering et al. ................. 705/10 |
| 6,933,841 | B2 * | 8/2005 | Muramatsu et al. ..... 340/539.13 |
| 7,334,249 | B1 * | 2/2008 | Byers ............................... 725/35 |
| 2002/0052781 | A1 * | 5/2002 | Aufricht et al. .................. 705/14 |
| 2003/0100315 | A1 * | 5/2003 | Rankin .......................... 455/456 |
| 2003/0149975 | A1 * | 8/2003 | Eldering et al. ................ 725/34 |
| 2006/0069616 | A1 | 3/2006 | Bau |
| 2006/0217110 | A1 * | 9/2006 | Othmer ....................... 455/414.1 |

OTHER PUBLICATIONS

International Search Report with Written Opinion for corresponding PCT Application No. PCT/IB2007/051563, mailed Oct. 10, 2007, 10 pages.

* cited by examiner

*Primary Examiner* — George A Bugg
*Assistant Examiner* — Edny Labbees
(74) *Attorney, Agent, or Firm* — Patrick B. Horne; Moore & Van Allen PLLC (57) ABSTRACT

A device may include a receiver to receive a data stream. The device may also include logic to insert a product placement into the data stream based at least one of a location of the device or information associated with a user of the device.

20 Claims, 6 Drawing Sheets

PRODUCT PLACEMENT

TECHNICAL FIELD OF THE INVENTION

The invention relates generally to product placement and, more particularly, to receiver based product placement.

DESCRIPTION OF RELATED ART

Product placement in various media has become an increasing source of revenue for media providers. For example, having a particular product or advertisement displayed within a sporting event, television show or movie allows the product or advertisement to reach a large number of viewers. Recently, "virtual product placement" has been used to insert products and/or advertisements into portions of a media stream, where the products and/or advertisements may not actually exist.

For example, in sporting events that are broadcasted to viewers, an advertisement may be displayed on a billboard in a stadium where the billboard and/or advertisement may be different than what actually exists at the live event. In other words, the advertisement that is broadcasted to the viewer may be different than what is physically on the billboard at the stadium. Alternatively, the billboard (along with the advertisement) may not even exist at the actual stadium. That is, the billboard and advertisement are merely inserted into the media stream to display the advertisement to viewers. Similarly, in television shows and movies, virtual product placements may be inserted after the movie has been produced. For example, a sign in a background of a scene may be inserted to advertise a particular product. Alternatively, a product displayed or used in a scene may be manipulated by a post production rendering process to advertise a particular product. For example, an actor holding a can of soda with a generic label during the actual filming may be changed by post production processing to display a particular brand of soda. The viewer is unable to detect any negative effects of the post production processing and will simply assume that the actor was drinking that particular brand of soda.

These conventional types of virtual product placements are inserted into a media stream by an entity that produces and/or distributes the media. That is, all post production processing is completed prior to distribution of the media. An end user device that plays the particular post production processed media stream merely displays the virtual advertisement within the media stream.

SUMMARY

According to one aspect, a device comprises a receiver configured to receive a data stream. The device also includes logic configured to determine if the received data stream includes product placement information, and identify a first product placement based on at least one of information associated with the device or a user associated with the device.

Additionally, the logic may be configured to identify the first product placement based on a location of the device.

Additionally, the device may further comprise a memory configured to store user profile information, and wherein the logic may be configured to identify the first product placement based on the user profile information.

Additionally, the data stream may comprise a plurality of product placements and the logic may be configured to select the first product placement from the plurality of product placements.

Additionally, the logic may be further configured to insert the first product placement into the data stream.

Additionally, the device may further comprise a display, and the logic may be configured to output the data stream to the display.

Additionally, the device may further comprise a communication interface configured to receive a modified data stream including the first product placement and output the modified data stream to another device for display.

Additionally, the logic may be further configured to signal another device with the identified first product placement.

Additionally, the device may further comprise a memory configured to store information identifying a plurality of product placements inserted into the received data stream for display.

Additionally, the device may comprise a mobile terminal or a set top box.

According to another aspect, a method is provided. The method comprises identifying information associated with a first party to whom a data stream is to be transmitted. The method also includes inserting a product placement into the data stream based on the identified information.

Additionally, the identifying may comprise identifying a location associated with the first party.

Additionally, the identifying may comprise identifying at least one of profile information associated with the first party or information associated with product placements previously viewed by the first party.

Additionally, the method may further comprise transmitting the data stream to device associated with the first party.

Additionally, the method may further comprise inserting a plurality of potential product placements into the data stream for a single product placement to be viewed by the first party. The method may also comprise transmitting the data stream with the plurality of potential product placements.

Additionally, the method may further comprise inserting a plurality of product placements into the data stream based on geographical location of a plurality of parties, wherein first product placements associated with the first party differ from second product placements associated with a second party.

Additionally, the method may further comprise receiving location information from the first party, and providing product placements in the data stream based on the received location information.

Additionally, the method may further comprise storing information indicating a number of product placements inserted into the data stream for a plurality of advertisers.

Additionally, the method may further comprise selecting the product placement based on an amount of money paid by an entity associated with the product placement.

According to a further aspect, a computer-readable medium having stored thereon sequences of instructions is provided. The instructions, when executed by at least one processor, cause the at least one processor to: receive a data stream including information representing a virtual product placement, and identify a first virtual product placement based on at least one of geographical information or user profile information.

Additionally, the computer-readable medium may further comprise instructions for causing the at least one processor to insert the first virtual product placement into the data stream Additionally, the computer-readable medium may Her comprise instructions for causing the at least one processor to track information identifying virtual product placements inserted into the data stream for a plurality of advertisers.

According to yet another aspect, a device comprises means for receiving a data stream and means for determining if a virtual product placement is to be inserted into the data stream. The device also comprises means for identifying a first virtual product placement based on a location of the device or information associated with a user of the device.

Additionally, the device may further comprise means for inserting the first product placement into the data stream based on the location of the device.

Additionally, the device may further comprise means for inserting the first product placement into the data stream based on user profile information comprising at least one of age, sex, an item of interest, an item of non-interest, a price value, or virtual product placements previously provided.

According to still another aspect, a device comprises a receiver configured to receive a data stream. The device also comprises logic configured to insert a product placement into the data stream based on at least one of a location of the device or information associated with a user of the device.

Additionally, the logic may be further configured to insert the product placement into the data stream based on the location of the device.

Additionally, the logic may be further configured to insert the product placement into the data stream based on information associated with a user of the device, the information comprising at least one of age, sex, an item of interest, an item of non-interest, or cost.

Additionally, the device may further comprise a global positioning system configured to provide a current location of the device.

Additionally, the logic may be further configured to track a plurality of product placements inserted into the data stream and at least one of a number of times or an amount of time that each of the plurality of product placements were viewable.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Implementations described herein allow particular product placements to be inserted into a media stream based on information associated with a receiver and/or end user that views the media stream. The terms "product placement" and "virtual product placement" are used interchangeably herein and as used herein refer to insertion of a product and/or advertisement into a media stream.

For example, the term product placement may include, but is not limited to, replacing an existing product and/or advertisement within a media stream/scene with a different product and/or advertisement. A product placement may also include placement of a product or advertisement in a media stream where no product or advertisement existed in the actual live event, recording, etc. A product placement may further include an advertisement, such as a banner advertisement, that may inserted into a media stream and displayed to a user such that the banner advertisement does not obstruct the scene. For example, a banner advertisement may be located at a lower, upper or side portion of a displayed scene. Alternatively, a banner advertisement may be located around a border of a displayed scene or used to create a border associated with the displayed scene. A product placement may also include a "pop up" advertisement that may quickly appear and disappear in a scene. In some instances, a product placement may include a purely audible advertisement.

Figure 1:
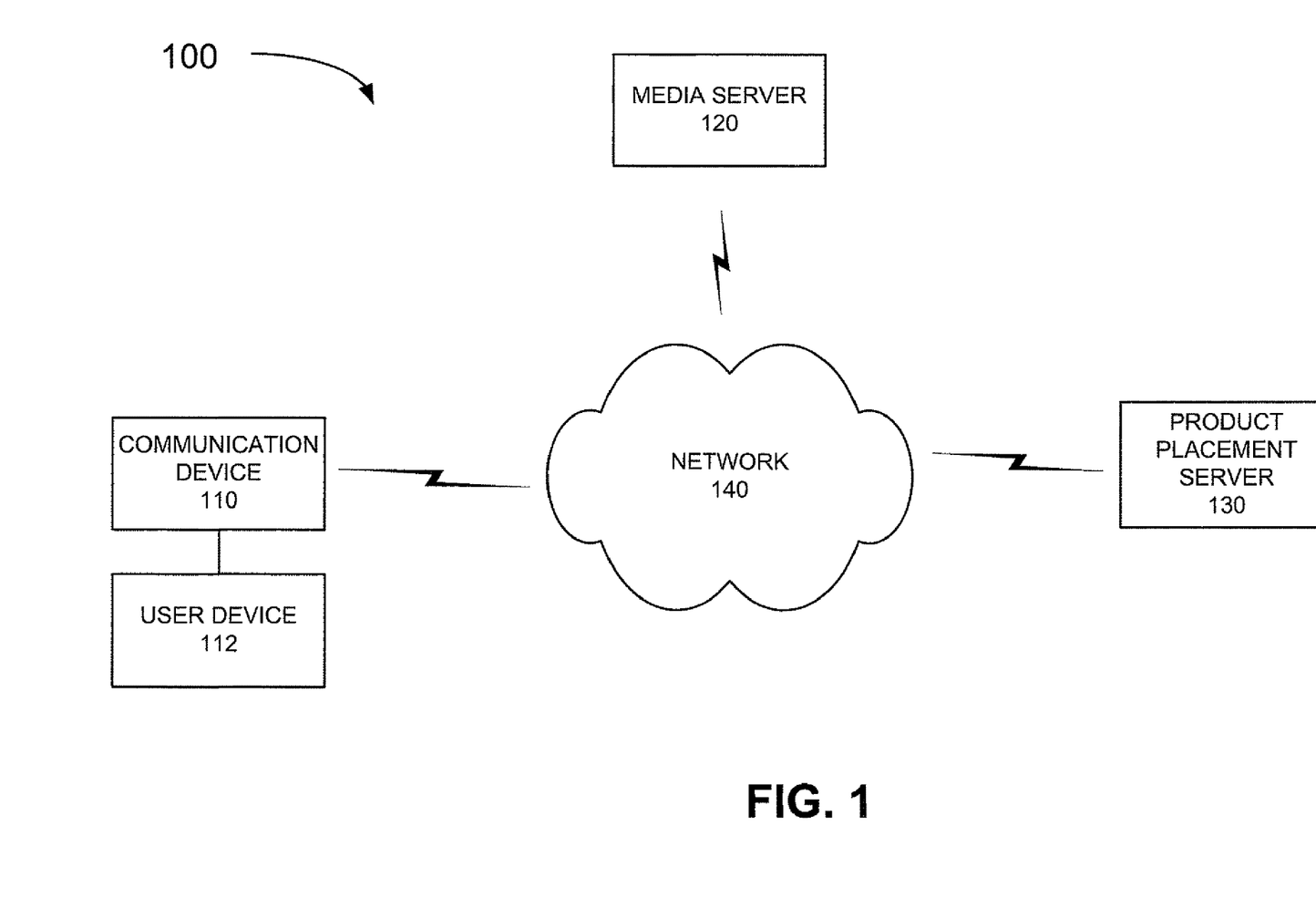
FIG. 1 is a diagram of an exemplary system in which methods and systems described herein may be implemented.

FIG. 1 is a diagram of an exemplary system 100 in which methods and systems described herein may be implemented. System 100 may include communication device 111, user device 112, media server 120, product placement server 130 and network 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Communication device 110 may include any type of communication device that is able to receive data, such as multi-media data. For example, communication device 110 may include any type of device that is capable of receiving data (e.g., voice, text, images, multi-media data) transmitted from a source, such as media server 120 or product placement server 130 and decode the data for output to user device 112 for display. In an exemplary implementation, communication device 110 may include a set top box used to decode incoming multi-media data, such as multi-media data received via a cable service provider, a satellite system, a wireless system or some other wired, wireless or optical communication medium. In some implementations, communication device 110 may forward the decoded data for playing by another device, such as user device 112. In other implementations, communication device 110 may play and display the decoded media to a user.

For example, communication device 110 may include some type of computer, such as a personal computer (PC), laptop computer, home theater PC (HTPC), etc., that is able to receive incoming data and decode the incoming data for output to a display, which may be included on communication device 110 or may be an external display device (e.g., user device 112).

Communication device 110 may also be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

User device 112 may include any device that is able to play various media, such as a television, monitor, PC, laptop computer, HTPC, a PDA, a web-based appliance, a mobile terminal, etc. In some instances, communication device 110 and user device 112 may be a single device that is able to receive media streams and play the received media streams to the user.

Media server 120 may include any server and/or computing device that is able to connect to network 140 and transmit and/or receive information via network 140. In an exemplary implementation, media server 120 may provide multi-media information, such as movies, television shows, sporting events, podcasts or other media presentations to various users, such as a user associated with communication device 110 and user device 112. In one implementation, media server 120 may provide multi-media data to users that include information associated with product placements, as described in detail below.

Product placement server 130 may include one or more server devices/platforms that provide information, such as product placement information and/or advertisements to other components in system 100, such as communication device 110, as described in detail below. For example, product placement server 130 may provide product placements that will be inserted into a media stream by communication device 110 and/or media server 120.

Network 140 may include one or more networks including a cellular network, a satellite network, the Internet, a telephone network, such as the Public Switched Telephone Network (PSTN), a metropolitan area network (MAN), a wide area network (WAN), a local area network (LAN) or another type of network. In an exemplary implementation, media server 120 and product placement server 130 may transmit data to communication device 110 via network 140. Network 140 may include base station antennas (not shown) that transmit and receive data from communication devices within their vicinity and base stations (not shown) that connect to the base station antennas and communicate with other devices, such as switches and routers (not shown) in accordance with known techniques.

Figure 2:
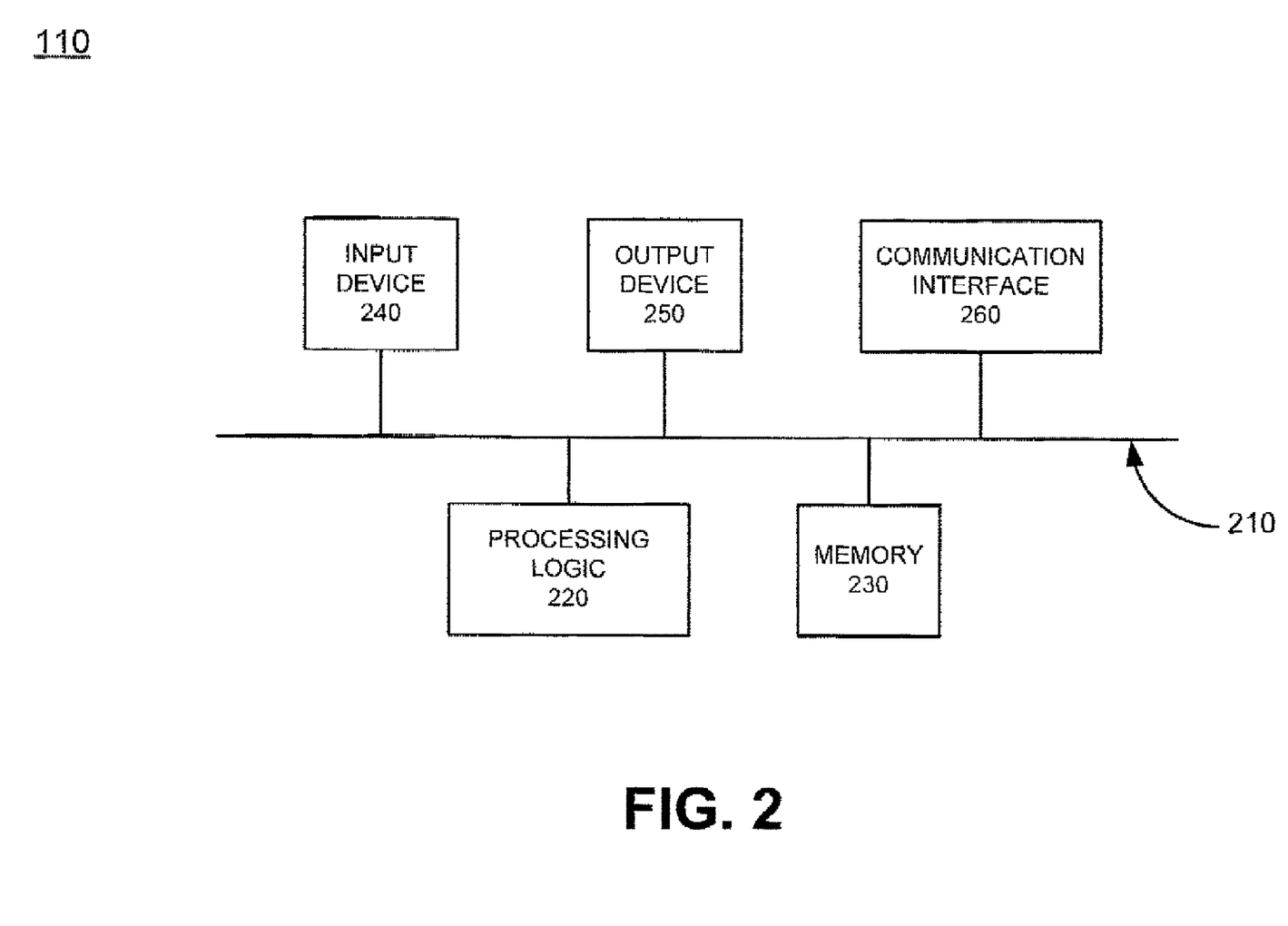
FIG. 2 is an exemplary diagram of a communication device of FIG. 1 according to an exemplary implementation.

FIG. 2 is a diagram of communication device 110 according to an exemplary implementation. It should be understood that user device 112, media server 120 and product placement server 130 may include the same or similar elements and may be configured in the same or a similar manner. Communication device 110 may include bus 210, processing logic 220, memory 230, input device 240, output device 250 and communication interface 260. Bus 210 permits communication among the components of communication device 110. One skilled in the art would recognize that communication device 110 may be configured in a number of other ways and may include other or different elements. For example, communication device 110 may include one or more power supplies (not shown). Communication device 110 may also include a modulator, a demodulator, an encoder, a decoder, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of communication device 110.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220

Input device 240 may include any mechanism that permits an operator to input information to communication device 110, such as a microphone, a keyboard, a keypad, a mouse, a pen, voice recognition and/or biometric mechanisms, etc. Input device 240 may also include one or more buttons that allow a user to receive a menu of options via output device 250. The menu may allow the user to select various functions or modes associated with applications executed by communication device 110.

Output device 250 may include one or more conventional mechanisms that output information to the user, including a display, a printer, one or more speakers, etc.

Communication interface 260 may include any transceiver-like mechanism that enables communication device 110 to communicate with other devices and/or systems. For example, communication interface 260 may include mechanisms for communicating via a network, such as the Internet, a terrestrial wireless network, a satellite-based network, etc. For example, communication interface 260 may include one or more radio frequency (RF) transmitters and receivers and/or transceivers. Additionally or alternatively, communication interface 260 may include a modem, an Ethernet interface to a LAN, and/or an interface/connection for connecting communication device 110 to another device, such as user device 112.

Communication device 110, consistent with aspects described herein, may perform processing associated with selecting and/or inserting product placements in a media stream or file. Communication device 110 may perform these operations in response to processing logic 220 executing sequences of instructions contained in a computer-readable medium, such as memory 230. Such instructions may be read into memory 230 from another computer-readable medium via, for example, communication interface 260. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 3:
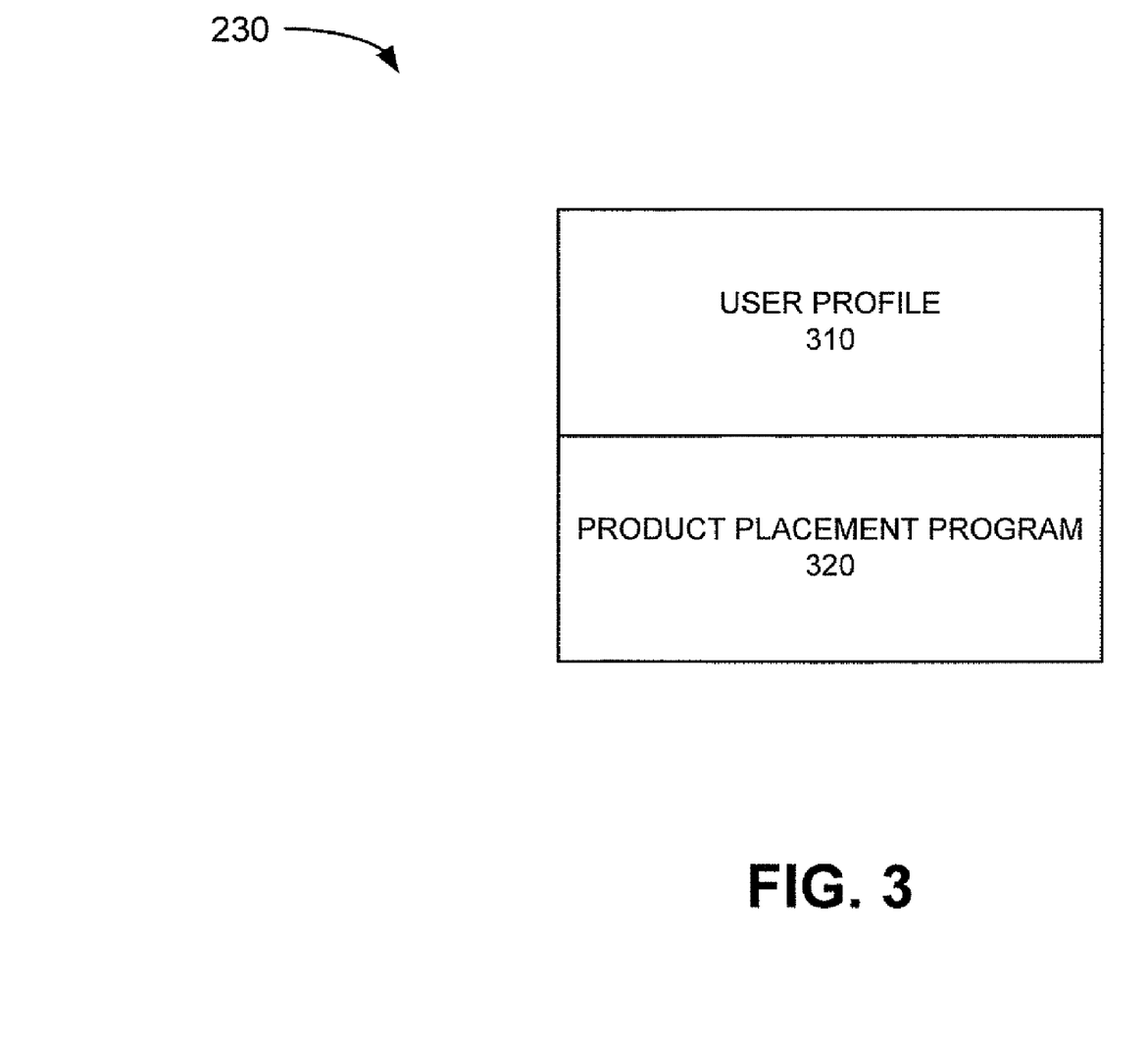
FIG. 3 is a block diagram of exemplary components implemented in the communication device of FIG. 2.

FIG. 3 is an exemplary functional block diagram of components implemented in the communication device 110 of FIG. 2, such as in memory 230, according to an exemplary implementation. Referring to FIG. 3, memory 230 may include user profile 310 and product placement program 320. User profile 310 may include information associated with communication device 110 and/or a user associated with communication device 110. For example, user profile 310 may include the geographical location, such as a city, state, region and/or country associated with communication device 110. User profile 310 may also include other information associated with a user of communication device 110, such as age, sex, particular areas of interest, areas of non-interest or dislike, etc. User profile 310 may include additional information, such as information associated with viewed items (e.g., a history of product placements previously viewed), a history of movies or programs viewed by a user of communication device 110, a history of geographical movement associated with a user of communication device 110 (e.g., movement back forth between work on a regular basis, movement associated with vacations taken, etc.) or other historical information, such as historical information associated with applications/files executed by communication device 110 or historical information associated with a user of communication device 110.

In some implementations, user profile 310 may include product placement selections provided by a user. For example, user profile 310 may include particular products or products associated with a category, such as cell phones. In this case, user profile 310 may include information indicating that the user would like to view product placements associated with a particular cell phone manufacturer, such as Sony Ericsson. In some implementations, the particular product information in user profile 310 may be used in combination with location information stored in user profile 310 to provide product placements that are likely to be relevant to the viewer. For example, suppose that user profile 310 includes information identifying Sony Ericsson for cell phone related product placements. Further assume that the geographic information in user profile 310 indicates that communication device 110 is currently located in the United States. In this case, product placements for cell phones will include Sony Ericsson cell phones that are available for sale in the United States. If the geographical information indicates that communication device 110 is currently located in Sweden, product placements for cell phones will include Sony Ericsson cell phones that are available for sale in Sweden.

In still other implementations, user profile 310 may include particular cost or cost threshold information associated with product placements. For example, user profile 310 may include information indicating that only products below a certain price, such as $100, are to be placed in a data stream. In this case, only product placements associated with products costing less than the particular amount (i.e., $100 in this example), will be placed in a data stream.

In some implementations, the information in user profile 310 may be entered by a user associated with communication device 110 via a graphical user interface (GUI). The GUI may be downloaded to communication device 110 via media server 120 or product placement server 130. Alternatively, some of the information in user profile 310 may be automatically stored in user profile 310 based on the location of communication device 110. For example, a GPS receiver may be included in communication device 110 which automatically stores the location of communication device 110 in user profile 310. In other alternatives, one or more cellular towers may provide the location information to communication device 110. In either of these cases, communication device 110 may store its current location in user profile 310 and may update this information as the location changes. For example, if communication device 110 is a mobile terminal, the location of communication device 110 may be updated in user profile 310 as the location of communication device 110 changes (e.g., as the user of communication device 110 travels).

In some implementations, user profile 310 may be stored on a computer-readable medium, such as a programmable card, that may be accessed and/or read by processing logic 220. An entity associated with providing communication device 110 to users (such as a cable TV service provider, satellite TV service provider, etc.) may provide the card with user profile 310 pre-stored on the card to the user of communication device 110. In this case, the pre-stored information may include the geographical location associated with where communication device 110 will be used, as well as other information associated with the user of communication device 110. In still other implementations, user profile 310 may be pre-stored in memory 230 at the time communication device 110 is provided to a user. In some implementations, the information in user profile 310 may be edited by a user via, for example, input device 240 of communication device 110.

The information in user profile 310 may be used to select a particular product placement for insertion within a media stream, as described in detail below.

Product placement program 320 may include a program that selects and/or inserts particular product placements into a media stream. For example, product placement program 320 may identify a particular product placement from a number of potential product placements for insertion in a data stream. Product placement program 320 may then insert the selected product placement into the media stream or signal another device to insert the particular product placement. Product placement program 320 may base its selection using user profile 310, as described in detail below.

In some instances, a number of potential product placements may be transmitted with the data stream. In other implementations, the product placements may be retrieved from product placement server 130 and/or retrieved from memory 230. Although user profile 310 and product placement program 320 are shown as separate programs, in some implementations, user profile 310 may be part of product placement program 320.

Figure 4:
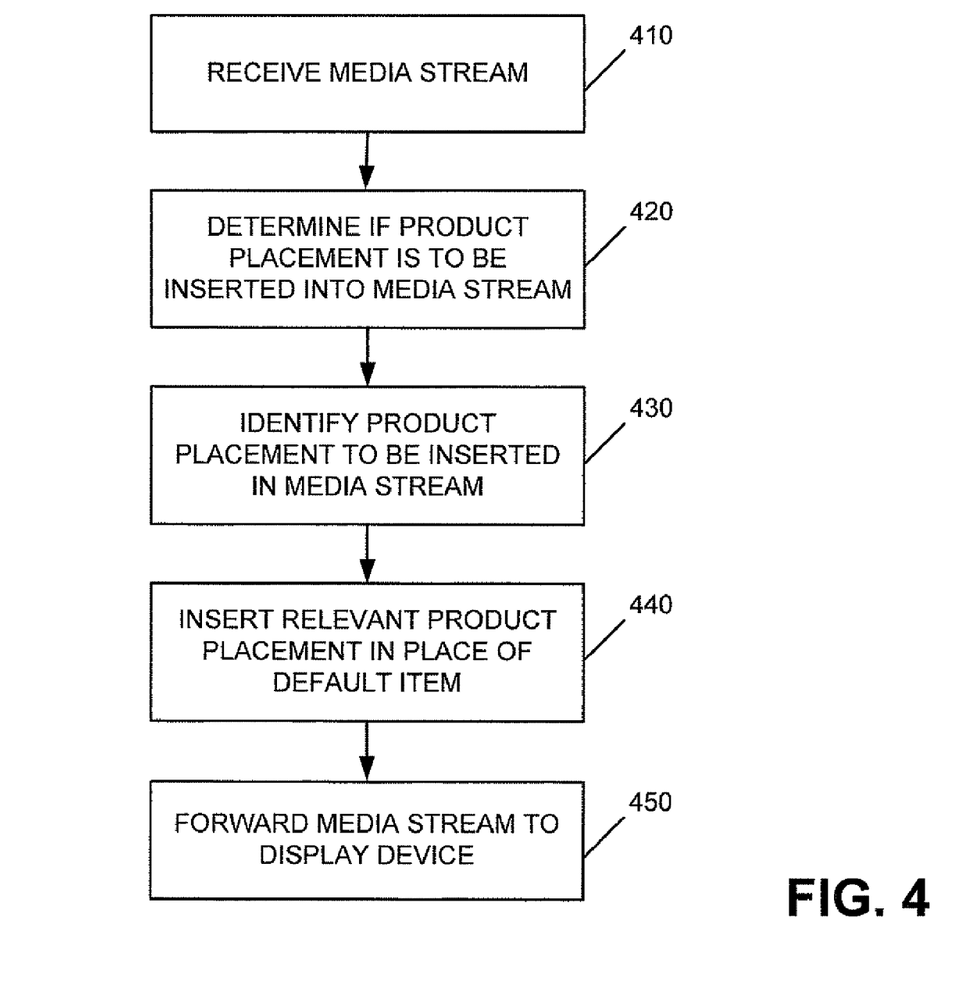
FIG. 4 is a flow diagram illustrating exemplary processing by components in the system of FIG. 1.

FIG. 4 is a flow diagram illustrating exemplary processing associated with product placement. Assume that communication device 110 is powered up and is receiving streaming data from media server 120 via network 140 (act 410). For example, as discussed previously, media server 120 may be a device that provides multi-media programming, such as movies, television shows, sporting events, etc., to various parties/end users.

Further assume that the media stream includes generic or default items or objects that may be replaced by particular product placements. For example, the media stream may include generic products or advertisements which may be replaced by product placements that may be more likely to be relevant to the particular party viewing the media stream. The media stream may also include various markers or identifiers associated with locations and durations of potential product placements in the media stream.

Communication device 110 may receive the data stream and determine if the data stream includes information indicating that a product placement may be inserted into the media stream (act 420). For example, as discussed above, the media stream may include one or more markers or identifiers that represent product placement information, such as a location for insertion of a product placement in the media stream. The product placement information may also include a duration indicating how long the product placement information is to be provided in the media stream and where the product placement is to be provided. The product placement information may further identify a particular type of item and may provide a number of options for insertion of a particular product placement into the media stream.

Figure 5A:
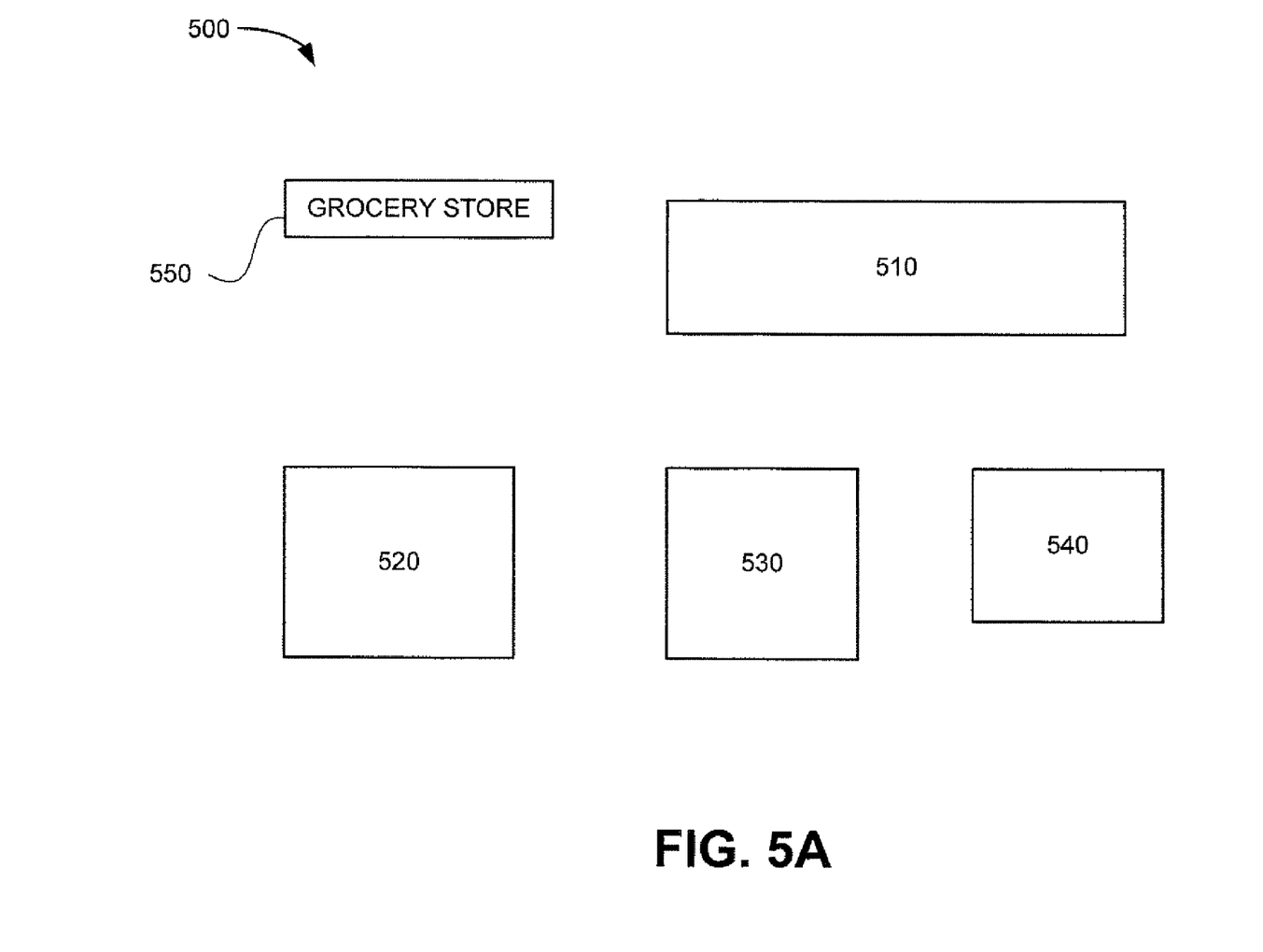
FIGS. 5A and 5B are diagrams schematically illustrating a media stream and a post production processed media stream.

As an example, assume that the media stream received by communication device 110 is a movie being streamed to communication device 110. Further assume that the media stream includes data representing a scene. For example, referring to FIG. 5A, a data stream representing scene 500 may include a number of objects 510-550. Objects 510-540 may represent people, trees, animals, buildings or other objects in a particular scene in the movie. Assume that object 550 is a sign, such as a generic sign labeled "Grocery Store", as illustrated in FIG. 5A. This sign may be located on the side of a building in a scene, on a billboard or some other location in scene 500. Alternatively, object 550 may be a blank space in scene 500 in which a virtual product placement may be inserted by post production processing. In either case, the media stream received from media server 120 may include an identifier associated with object 550 that indicates a product placement may be inserted at object 550.

Product placement program 320 may then identify the product placement information in the media stream and identify an appropriate product placement to insert into the media stream at the location of object 550 (act 430). For example, product placement program 320 may identify that object 550 is a generic placeholder/default item associated with a grocery store. Product placement program 320 may then access user profile 310 and identify, for example, the geographical location associated with communication device 110. Product placement program 320 may also select a particular product placement for insertion in the media stream based on the geographical location in user profile 310.

For example, the media stream transmitted to communication device 110 at act 410 may include a number of potential product placements for object 550. Each of these potential product placements may be associated with a particular geographical region (e.g., city, state, regions, country, etc.). For example, assume that the media stream includes information indicating three possible grocery stores associated with object 550 based on the particular geographical region in user profile 310 (e.g., the East, Midwest and West regions of the United States). Further assume that one of the possible product placements is for a grocery store named "T & J Groceries", which may be a chain of grocery stores in the Eastern United States.

Product placement program 320 identifies the location of communication device 110 and then identifies the product placement for object 550 that is most relevant to the location of communication device 110. For example, in this scenario, assume that communication device 110 is located in Virginia. In this case, product placement program 320 may determine that the product placement associated with the Eastern United States is most relevant. That is, product placement program 320 may select the product placement for T & J Groceries as being the most likely relevant product placement.

Product placement program 320 may then signal processing logic 220 to insert the product placement for T & J Groceries into the location for object 550. Processing logic 220 may then insert the product placement for T & J Groceries into the media stream in place of the default/generic item (act 440).

Figure 5B:
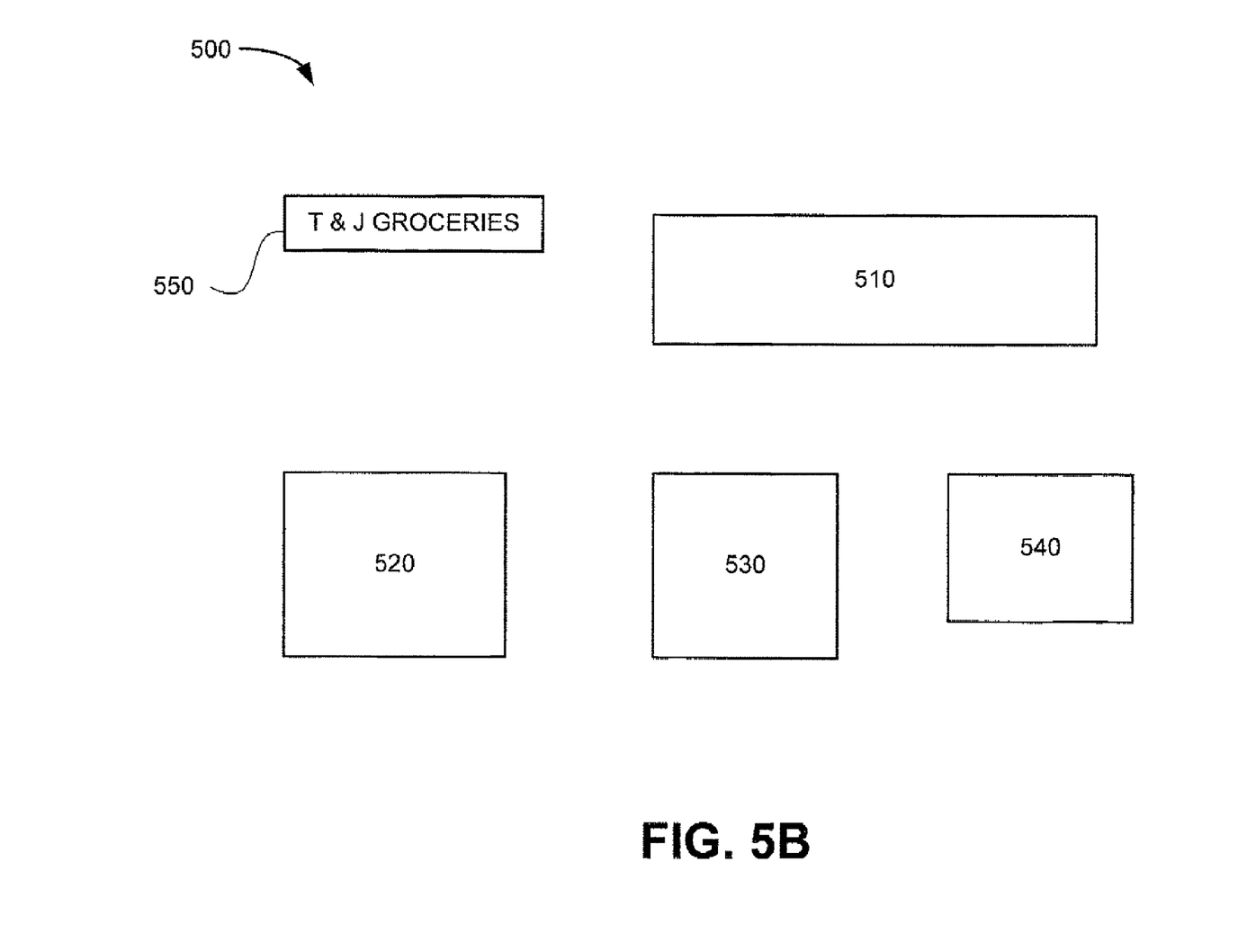

For example, processing logic 220 may insert the product placement for T & J Groceries into scene 500, as illustrated in FIG. 5B. Referring to FIG. 5B, the label/sign T & J Groceries has been inserted at the location of object 550. In this manner, product placement program 320 may identify a product placement that will most likely be relevant to an end user/viewer based on information in user profile 310. For future scenes/images involving the same or similar product placements, such as scenes including a generic placeholder/default item associated with a grocery store, processing logic 220 may automatically insert the product placement for T & J Groceries into the scene without going through the processing described above. That is, processing logic 220 may select the appropriate product placement once for each particular generic placeholder/default item associated with a product placement and store a history of previous product placements. Processing logic 220 may then insert the same product placement as that previously selected for the particular generic placeholder/default item in the media stream.

In this example, product placement program 320 used geographical information in user profile 310 to identify an appropriate product placement. In other implementations, other user information may be used to identify appropriate product placements.

For example, as described previously, user profile 310 may include particular types of products for which a user would like to see advertisements, such as particular cellular telephones, soft drinks, food, etc. User profile 310 may also include particular types of products for which the user would not like to see advertising or has no interest (e.g., cigarettes, alcohol, etc.). In this case, product placement program 320 may determine a most relevant product placement for which a user would like to see an advertisement and also ensure that a particular product placement does not conflict with information identifying a product for which a user would not like to see advertising. User profile 310, as described above, may also include price or cost threshold information associated with product placements. In this case, product placement program 320 may identify products below the cost threshold for placement in the media stream and may not place products above the cost threshold in the media stream.

Product placement program 320 may also use a combination of the items/information stored in user profile 320 to identify a particular product placement to insert in a media stream. For example, assume that user profile 310 stores information identifying Sony Ericsson as the manufacturer associated with cell phone related product placements. Further assume that user profile 310 indicates that the user would like to view product placements priced below $100. In this case, product placement program 320 may identify a particular Sony Ericsson cell phone priced below $100 for placement in a media stream. In this manner, user profile 310 may allow a user to essentially filter particular product placements based on his/her particular preferences, interests, etc., as well as avoid product placements based on particular dislikes.

In each case, after processing logic 220 has inserted the appropriate product placement into the media stream, the media stream may be forwarded to a display device, such as user device 112 (act 450). For example, communication device 110 may output the media stream with the inserted product placement to user device 112 for playing/display. As described above, user device 112 may be a television or monitor used to play the decoded data from communication device 110. In this implementation, communication device 110 may insert the product placements into the received media stream and forward the media stream for display by user device 112 with little to no delay such that the media stream is displayed to a user via user device 112 in a seamless manner. That is, the user is unable to view the media with the inserted product placement with no negative effects associated with the post production processed media stream.

In some implementations, the potential product placements may not be transmitted in the data stream itself In such implementations, the media stream may include an identifier or marker identifying a type of product placement (e.g., product placement for a soft drink, cellular telephone, etc.). Product placement program 320 may then detect a product placement identifier/marker and select a particular product placement. Communication device 110 may then signal another device/system to provide and/or insert the particular product placement. For example, the product placement may be provided from another source, such as product placement server 130 via network 140 (e.g., the Internet).

It should be understood that in some implementations, the identifier/marker associated with product placement in the media stream may include other information to facilitate the insertion of a product placement. For example, the identifier may include a size and other parameters associated with the location of a product placement in a scene. Product placement program 320 may use this information to determine how and where to insert the product placement. In this manner, communication device 110 is able to quickly insert the product placement in a scene or signal another device to provide the appropriate product placement that may be merged into a data stream. In each case, product placement program 320 may access user profile 310 and identify an appropriate product placement to insert into the place of generic or default information.

In some implementations, media server 120 may provide particular product placements based on its location. For example, a cable television service provider, satellite television service provider, etc., may automatically provide localized product placement based on its location and/or the location of end users to whom the media stream is being broadcasted. As an example, a television service provider in Sweden may automatically insert product placements in a media stream that are most likely to be relevant to a person in Sweden. In such implementations, the media service provider associated with media server 120 may also have user profile information similar to that described above in user profile 310 which enables the media service provider to further customize and select product placements that are even more likely to be relevant to the end user.

In further implementations, the particular product placements provide to a user may change as the user changes location. For example, suppose that a user is riding a bus and watching a video stream with his/her communication device 110, such as a mobile terminal 110. As the bus travels, the advertisements may change based on the updated geographical information stored in user profile 310. That is, communication device 110 may update its geographical location. Product placement program 320 may then identify likely relevant product placements based on the current location of communication device 110. In this manner, dynamic changes in the location of communication device 110 are taken into consideration when selecting appropriate product placements.

In some implementations, local, regional or national manufacturers of products may be able to purchase product placements based on the region or geographical area. For example, a manufacturer associated with a soft drink made in Japan may purchase an advertisement for that soft drink. When the media server 120 is providing the media stream to viewers in Japan, media server 120 may provide that particular product placement as one of the potential product placements for insertion in the media stream. Alternatively, media server 120 may automatically insert that product placement in the media stream for end users/viewers in Japan.

In other implementations, various retailers, such as specialty stores, may purchase product placements based on information stored in user profiles associated with various end users. For example, a specialty store selling automotive supplies may purchase a product placement to be provided to end users whose user profile 310 indicates an interest in cars in general and/or fixing cars in particular. The granularity or level at which the user profiles 310 provide information may allow the advertisers to specifically target particular product placements to groups of end users who would be most likely interested in the product placement. In this manner, product placements are even more likely to be relevant to the various end users/viewers.

Further, local advertisers, such as a local or regional store, may not be limited to advertising in only local broadcasts. For example, a relatively small local or regional business may provide advertisements within a media stream associated with a national sporting event, but may limit its particular advertisement to end viewers of its choosing. This may increase the effectiveness of the advertiser's product placement.

In still other alternatives, an entity associated with media server 120 may insert product placements based on how much an advertiser pays for a product placement. For example, advertisers may bid for product placements and the product associated with the highest bidder may be inserted in the media stream.

In some of the implementations described above, advertisers have been described as purchasing product placements or advertisement for insertion in a media stream. In some of these implementations, product placement program 320 may not be able to override the product placements purchased by the advertiser. That is, the media stream may be coded or programmed to not allow insertion of product placements at the receiver (e.g., communication device 110) to override paid for product placements. In still further alternatives, if a particular advertiser or manufacturer has purchased advertising during production of an actual media stream, such as purchased advertising/product placements during filming of a movie, the media stream (i.e., movie in this case) may be programmed or coded to not allow insertion of product placements at the receiver to override paid for product placements/advertisements.

In implementations described above, various product placements may be inserted into a data stream for viewing by an end user. In some implementations, communication device 110 may store information identifying the particular product placements (e.g., which product placements were selected/inserted, how many times a particular product placement was inserted, the duration of time that a particular product placement was viewable, etc.). This information may be forwarded to, for example, media server 120 on a periodic basis. Media server 120 may then use this information for billing purposes. For example, media server 120 may charge an advertiser based on the number of product placements and how many times each product placement was inserted. In other implementations in which media server 120 selects and inserts the particular product placements, media server 120 may track the particular product placements and number of times each product placement was inserted in a media stream. In each case, an entity associated with media server 120 may charge various advertisers based on number of product placements inserted into the media stream.

As described above, in some implementations, the potential product placements may be transmitted with the media stream. In other implementations, the potential product placements may be received from another source or media stream, such as via the Internet, a terrestrial wireless network, a satellite network, etc. In these cases, the product placements may be received concurrently with a received media stream for immediate insertion into the media stream. Alternatively, the product placements may be received prior to the actual data stream and stored at communication device 110, such as in memory 230. In this case, the product placements stored locally at communication device 110 may be selected and seamlessly inserted into the media stream such that the end user is able to view the product placement with no adverse effects.

CONCLUSION

Implementations described herein allow product placements to be inserted into a media stream based on information associated with a receiver or viewer of the media stream. This may make it more likely that the viewer will find the product placement to be relevant and of interest, thereby making the product placement more valuable to the entity associated with the product placement. In addition, aspects described herein may enable advertisers to more particularly target advertisements to end viewers of their choice. This may increase the effectiveness of the advertisers' product placements.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein have been described with respect to various entities, such as communication device 110, user device 112, media server 120 and product placement server 130 performing various operations. It should be understood that in other implementations, operations performed by one or more of these components may be performed by another component. In addition, it should also be understood that in other implementations, the operations described above as being performed by various components illustrated as separate components may alternatively be performed by a single component.

Further, while series of acts have been described with respect to FIG. 4, the order of the acts may be varied in other implementations consistent with the invention. Moreover, non-dependent acts may be performed in parallel.

It will also be apparent to one of ordinary skill in the art that aspects of the invention, as described above, may be implemented in communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device, comprising:
   a receiver to receive a video stream;
   a memory storing instructions to:
     detect an identifier in the received video stream, where the identifier represents product placement information, identifying a particular type of product placement associated with an object in a scene of the received video stream,
     select a first product placement, of a plurality of potential product placements for the particular type of product placement, based on the identifier, where a relevance is determined for each of the plurality of potential product placements based on a user profile, associated with the mobile communication device, and the particular type of product placement,
     replace the object with the first product placement,
     detect a change in a location of the mobile communication device,
     select a second product placement based on the change in the location of the mobile communication device, and
     replace another object in another scene, of the received video stream, with the second product placement; and
   a processor to execute the instructions.

2. The mobile communication device of claim 1, where the video stream comprises the plurality of potential product placements and the first product placement is determined to have the most relevance of the plurality of potential product placements.

3. The mobile communication device of claim 1, further comprising:
   a display, and where the memory includes instructions to output the video stream to the display, after replacing the object with the first product placement.

4. The mobile communication device of claim 1, further comprising:
   a communication interface to receive a modified video stream including the first product placement and output the modified video stream to another device for display.

5. The mobile communication device of claim 1, where the memory includes instructions to:
   signal another device with the identified first product placement.

6. The mobile communication device of claim 1,
   where the memory is further to store information identifying the first and second product placements inserted into the received video stream.

7. A method performed by a communication device, the method comprising:
   receiving, using a communication interface associated with the communication device, a video stream;
   determining, using a processor associated with the communication device, that the received video stream includes product placement information identifying a particular type of product placement associated with an object in a scene of the video stream;
   identifying, using the processor, information associated with a first party to whom a video stream is to be transmitted;
   detecting, using the processor, a current geographic location of the communication device;
   selecting, using the processor, a product placement, of a plurality of potential product placements for the particular type of product placement, based on a relevance of each of the plurality of potential product placements determined using the identified information, the identifier included in the product placement information, and the current geographic location of the communication device; and inserting, using the processor, the selected product placement, into the video stream, for the object.

8. The method of claim 7, where identifying comprises:
identifying at least one of profile information associated with the first party or information associated with product placements previously presented to the first party.

9. The method of claim 7, further comprising:
transmitting the video stream to a device associated with the first party.

10. The method of claim 7, further comprising:
inserting the plurality of potential product placements into the video stream for a single product placement to be presented to the first party; and
transmitting, to a display, the video stream with the plurality of potential product placements.

11. The method of claim 7, further comprising:
inserting a plurality of product placements into the video stream based on geographical locations of a plurality of parties, where first product placements, of the plurality of product placements, associated with the first party differ from second product placements, of the plurality of product placements, associated with a second party, when the geographic location of the first party differs from the geographic location of the second party.

12. The method of claim 7, further comprising:
storing information indicating a number of product placements inserted into the video stream for a plurality of advertisers.

13. The method of claim 7, where selecting the product placement is further based on an amount of money paid by an entity associated with the product placement.

14. A memory device having stored thereon sequences of instructions which, when executed by at least one processor of a communication device, cause the at least one processor to:
receive a video stream including information representing a virtual product placement, where the information includes an identifier indicating a particular type of product placement associated with an object in a scene of the received video stream;
detect particular location of the communication device;
identifying, based on the particular location of the communication device, a plurality of virtual product placement candidates for the particular type of product placement;
select, from the plurality of virtual product placement candidates, a particular virtual product placement based on a relevance of each of the plurality of virtual product placement candidates determined using the identifier and user profile information associated with a recipient of the received video stream;
insert the selected virtual product placement into the received video stream; and
provide the received video stream with the inserted selected virtual product placement to the recipient.

15. The memory device of claim 14, further comprising instructions for causing the at least one processor to track information identifying virtual product placements inserted into the received video stream for a plurality of advertisers.

16. A communication device, comprising:
means for receiving a video stream including product placement information;
means for determining, based on the product placement information, that a particular type of virtual product placement is to be inserted into the video stream;
means for detecting a particular location of the communication device;
means for identifying, based on the particular location of the communication device, a plurality of virtual product placement candidates for the particular type of virtual product placement;
means for selecting, from the plurality of virtual product placement candidates, a particular virtual product placement based on a relevance of each of the plurality of virtual product placement candidates determined using the product placement information and a user profile associated with the communication device, where the user profile includes at least one of:
a history of product placements associated with the communication device,
a history of geographic movement associated with the communication device, or
a history of activated applications or files associated with the communication device; and
means for inserting the selected virtual product placement into the video stream.

17. The communication device of claim 16, where the user profile further includes a maximum price value for virtual product placements, where the means for selecting a particular virtual product placement is configured to select the particular virtual product placement further based on the maximum price value.

18. A communication device, comprising:
a receiver to receive a data stream;
a global positioning system to provide a current location of the communication device;
a memory storing instructions to:
detect that the received data stream includes product placement information indicating a particular type of product placement,
select a product placement, of a plurality of potential product placements for the particular type of product placement, based on a relevance of each of the plurality of potential product placements determined using the current location of the communication device and a user profile associated with the communication device, where the user profile includes at least one of:
a history of product placements associated with the communication device,
a history of geographic movement associated with the communication device, or
a history of activated applications or files associated with the communication device, and
insert the selected product placement into the data stream; and
a processor to execute the instructions.

19. The communication device of claim 18, where the user profile further includes information associated with a user of the communication device, the information comprising a threshold cost for the product placement, where the memory further stores instructions to generate the plurality of potential product placements based on the threshold cost.

20. The communication device of claim 18, where the history of product placements associated with the communication device includes:
at least one of a number of times or an amount of time that each of a plurality of product placements were displayed.

* * * * *